Patented June 29, 1926.

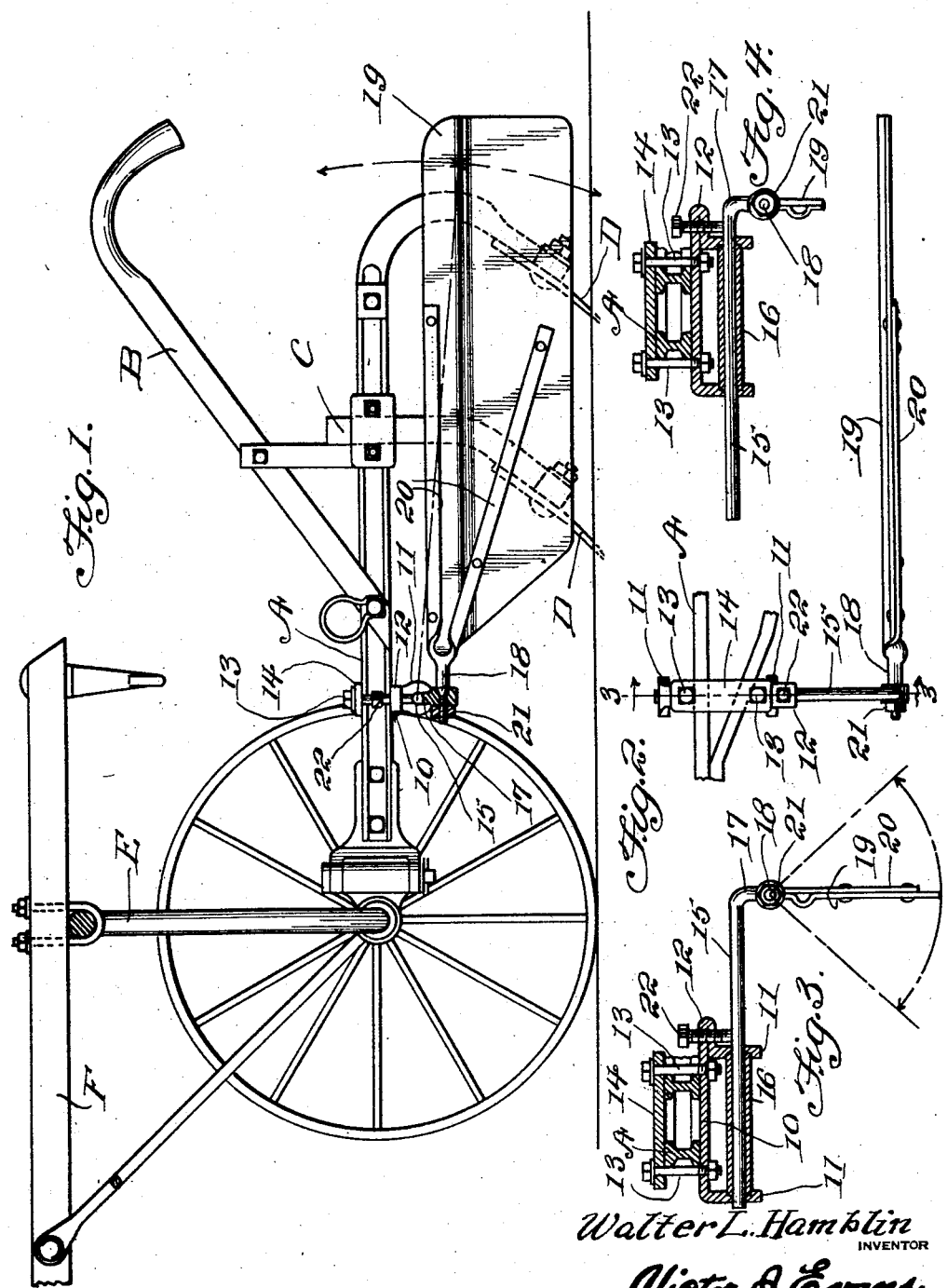

1,590,941

UNITED STATES PATENT OFFICE.

WALTER L. HAMBLIN, OF PISGAH, IOWA, ASSIGNOR OF ONE-FOURTH TO M. S. VAN EATON AND ONE-FOURTH TO C. S. VAN EATON.

CULTIVATOR SHIELD.

Application filed February 9, 1925. Serial No. 7,991.

This invention relates to agricultural implements particularly to cultivators, and has for its object the provision of a novel shield device adapted to be attached to the beams of a cultivator of ordinary construction and operating to prevent earth dug up by the cultivator blades or teeth from falling over too closely against the rows of plants being cultivated.

An important object is the provision of a shield attachment of this character which is well adapted for use with checked or listed corn or in fact any other type of growing plants.

Another object is the provision of a device of this character which is adjustable whereby the angle of the shield with respect to the ground and rows of plants may be varied and whereby the height may likewise be varied to meet different conditions and insure the best results.

An additional object is the provision of a device of this character which will be simple and inexpensive in manufacture, which may be built and applied to already existing cultivators without involving any changes in the construction thereof, which will be efficient and durable in service and a general improvement in the art.

With the above and other objects and advantages in view, the invention consists in the details of construction to be hereinafter more fully described and claimed, and illustrated in the accompanying drawings wherein:

Figure 1 is a side elevation of a cultivator equipped with the attachment,

Figure 2 is a fragmentary plan view,

Figure 3 is a section taken on the line 3—3 of Figure 2,

Figure 4 is a similar view showing the shield in a different adjusted position.

Referring more particularly to the drawings, the letter A designates the beams of a cultivator, with which beams are connected the usual handle B and standards C carrying the cultivator blades or teeth D. The beams are here represented as connected with a suitable frame or axle structure E with which is connected some suitable draft beam or tongue indicated at F. The details of the cultivator itself is of no consequence inasmuch as the invention lies in the attachment.

In carrying out the invention I provide an attachment which comprises a bracket 10 having depending parallel portions 11 and a horizontal extension 12 at one end. This bracket is intended for disposition against the underside of the beams A and is held in place by means of suitable bolts 13 or the like which pass through the bracket and through a clamping plate 14 mounted on the top of the beams. It is preferable that the bolt 13 be so arranged as to engage against the outer sides of the beams and thus prevent movement of the supporting structure in any direction.

Slidably mounted through the depending portions 11 of the bracket is a shaft 15 which extends through an elongated sleeve 16 mounted between the extensions 11 and constituting a bearing. The outer end of this shaft is formed with a downturn extension 17 through which is rotatably engaged a trunnion member 18 carried by an elongated shield 19. In actual practice it is preferable that the trunnion member 18 be formed upon a brace device including divergent arms 20 riveted or otherwise rigidly secured to the shield. This particular arrangement is preferable in view of the great strength which will be given to the shield. The trunnion member 18 has its end portion reduced and threaded and engaged upon this threaded portion is a nut 21 provided for the purpose of maintaining any rotatably adjusted position of the trunnion with the shield 19 extending in vertical position as shown in full lines in Figure 3 or in any angular position between the dotted lines in the same figure.

The shaft member 15 is intended to be adjustable laterally with respect to the cultivator, an outer position being illustrated in Figure 3 and an inner position being disclosed in Figure 4, and either or any intermediate desired position is maintained by means of a suitable set screw 22 which passes through the horizontal extension 12 of the bracket and which engages the shaft 15. Furthermore, the shaft 15 is rotatable with respect to the bracket so that the rear end of the shield 19 may be caused to extend upwardly or downwardly as indicated by the arrows at the ends of the dotted lines in Figure 1 and the same set screw 22 provided for holding and maintaining any desired longitudinally adjusted position acts to maintain the rotatably adjusted position.

When the device is constructed, assembled and installed as above described and as shown in the drawings, it is obvious that the shield 19 may be adjusted to any desired angular position either laterally or vertically and may be arranged at any desired distance from the ground engaging blades or tools or at any desired distance from the rows of adjacent plants in order that the shield will act to prevent the soil thrown up by the ground engaging elements from falling upon and burying the young plants in the adjacent row.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. In combination with a cultivator, a shield device comprising a pair of clamping members adapted for engagement upon the top and bottom of the beams of a cultivator, means for holding the clamping members together, the lower clamping member being provided with depending spaced parallel portions, a bearing located between said parallel portions and restrained from movement with respect thereto, a shaft slidably and rotatably engaged within said bearing member, said shaft having a downturned outer end, and a shield device pivotally mounted upon said downturned end and swingable into adjusted position in a vertical direction.

2. A shield device for cultivators having beams, comprising a bracket member disposable beneath the beams, and formed as a plate of angular formation provided with depending flange members, a plate disposed above the beams, bolts passing through both plate members outwardly of the beams for effecting a clamping action, a bearing sleeve located between the depending flange portions of the first named bracket member, a set screw passing through said first named bracket member, a shaft or rod journally and slidably mounted through said depending flange portions and said bearing sleeve and having a downturned outer end, and a plate-like guard member of elongated substantially rectangular formation pivotally adjustably mounted upon the downturned end of the shaft.

In testimony whereof I affix my signature.

WALTER L. HAMBLIN.